United States Patent Office 2,895,985
Patented July 21, 1959

2,895,985

PROCESS FOR THE PREPARATION OF TRIALKOXYBOROHYDRIDES

Richard A. Carpenter, Prairie Village, Kans., assignor to Callery Chemical Company, Pittsburgh, Pa., a corporation of Pennsylvania No Drawing. Application July 2, 1954
Serial No. 441,164

5 Claims. (Cl. 260—462)

This invention relates to the preparation of trialkoxyborohydrides and more particularly to an improved method for preparing trialkoxyborohydrides of the alkali and alkaline earth metals in substantially quantitative yield and relatively short reaction time from alkali or alkaline earth metal hydrides and borate esters using certain compounds as catalysts.

The alkali and alkaline earth metal trialkoxborohydrides are strong reducing agents and for that reason improved methods for their preparation have received considerable attention in recent years. Sodium trimethoxyborohydride is of special interest because of its specific reducing properties and the ease by which it may be handled. It is usually prepared by reacting sodium hydride and trimethylborate. Schlesinger (75 J.A.C.S. 193) carried out this reaction at the reflux temperature of trimethylborate (68° C.) but it required several hours for completion. Brown and others (75 J.A.C.S. 6263) carried out the same reaction in a large quantity of tetrahydrofuran as a solvent which reduced the time required to complete the reaction. However, both of these methods possess inherent disadvantages. The first method requires a long reaction time due apparently to the insolubility of sodium hydride and sodium trimethoxyborohydride in trimethylborate. Furthermore, the sodium hydride particles become coated with the desired product which greatly retards the speed of the reaction. The second method requires a large excess of a relatively expensive solvent and must be carried out in a meticulous manner in order to avoid the hazards of an explosion.

It is an object of this invention to provide an improved and economical method for preparing alkali and alkaline earth alkoxyborohydrides. Another object is to provide an improved method for preparing sodium trimethoxyborohydride from sodium hydride and trimethylborate in a relatively short time at a relatively low temperature by using certain surface-active compounds as catalysts. Further objects and advantages over existing processes will become apparent throughout the specification and claims as hereinafter related.

This method will be fully described herein and the novelty thereof will be particularly pointed out and distinctly claimed.

This invention is based on the discovery that certain organic amines and ethers, and derivatives thereof, when present in very small quantities will accelerate the reaction of an alkali or alkaline earth metal hydride and a borate ester such as trimethylborate to form a metal trialkoxyborohydride. Apparently, the effect is one of surface action on the alkali or alkaline earth metal hydride which allows the trimethylborate to wet or penetrate the coating of alkali or alkaline earth metal trimethoxyborohydride formed thereon. It has been found that this reaction will go to completion in a few minutes and at temperatures as low as 25° C. when one to ten mol percent of certain organic amines or polyglycol ethers is added to a mixture of alkali or alkaline earth metal hydride and trimethylborate. Moreover, the purity of the alkali or alkaline earth metal hydride may be relatively low without affecting the speed or yield of the reaction. The types of compounds which exhibit this activity are limited to those which are stable in the presence of the alkali or alkaline earth metal hydride used.

In one experiment sodium trimethoxyborohydride was prepared by mixing 6 grams of sodium hydride (0.25 mol) and 29 grams of trimethylborate (0.275 mol) in a suitable flask equipped with a reflux condenser. The mixture was heated on a steam bath to 60° C. and 2.1 g. of piperidine (0.025 mole) was added. The time required for the reaction to proceed to completion was thirty minutes. At this point substantially all of the liquid had disappeared and the flask was filled with a fluffy light grey solid. This solid was filtered off, washed with dry petroleum ether and vacuum dried at 50° C. A substantially quantitative yield of sodium trimethoxyborohydride of 97% purity was obtained. A similar experiment using one mol percent of piperidine based on the amount of sodium hydride used required 42 minutes for completion. In control runs using no catalyst from 6 to 24 hours was required to complete the reaction. Other experiments which were carried out showed that sodium hydride and trimethylborate will react at room temperature in a very short time if 1 to 10 mole percent quantities of piperidine based on the amount of sodium hydride used is added. When reacting sodium hydride and trimethyl borate, a 10 percent molar excess of the borate may be used.

In still other experiments several compounds were investigated to determine their catalytic effect in various concentrations on the rate of formation of sodium trimethoxyborohydride. The solubility of sodium trimethoxyborohydride in these compounds was also measured in order to correlate this value with catalytic ability. The results are shown below:

| Solvent | Solubility g. TMB/ 100 g. at 25° C. | Time to complete reaction (minutes) | |
|---|---|---|---|
| | | 1 mol percent | 10 mol percent |
| Tetrahydrofuran | 40 | 138 | 18 |
| Tetramethylethylenediamine | 43 | 120 | 48 |
| Dioxane | 36 | 210 | 90 |
| N-methyl morpholine | 22 | 150 | 78 |
| Ethyleneglycol-dimethyl ether | 22 | 180 | 102 |
| Pyridine | 18 | 72 | 102 |
| Piperidine | 16 | 42 | 30 |
| N-methyl piperidine | 5 | 240 | 102 |
| Diethyleneglycoldimethylether | 2.6 | 342 | 90 |
| Tetraethyleneglycoldimethylether | 2.3 | 78 | 102 |
| N,N-dimethylaniline | 1.4 | 378 | 180 |
| Triethyleneglycoldimethylether | 1.0 | 24 | 78 |

These data clearly show that certain organic amines and ethers, such as cyclic amines and cyclic ethers, and polyamines and polyethers, are highly effective as catalysts in the preparation of sodium trimethoxyborohydride from sodium hydride and trimethylborate when used in 1 to 10 mol percent quantities based on the amount of sodium hydride used. It is also apparent from the foregoing data that there is no direct correlation between the solubility of sodium trimethoxyborohydride in these compounds at 25° C. and their catalytic effect. These experiments also established the fact that sodium hydride of low purity may be used without affecting the yield or speed of the reaction. Other experiments with these catalysts show the reaction time is not substantially affected by the use of large quantities of the catalysts. These compounds therefore are sufficiently active in small quantities (i.e. catalytic quantities) to produce the desired increase in reaction rate. Aniline, morpholine, and ethylene diamine also may be used in accordance with my invention.

It should be noted that the nomenclature of the substituted borohydrides is that suggested by Schlesinger at 75 J.A.C.S. 187.

While several embodiments of this invention have been described using sodium hydride and trimethylborate it is to be understood that other alkali or alkaline earth metal hydrides as well as other borate esters may be used if desired and that within the scope of the appended claims this invention may be practiced otherwise than as specifically described.

Having thus described this invention fully and completely what is desired to be claimed and secured by Letters Patent of the United States is:

1. A method of preparing alkali metal triloweralkoxyborohydride which comprises reacting an alkali metal hydride and a lower alkyl borate ester in the presence of about 1 to 10 mol percent, based on said hydride reactant, of a compound selected from the group consisting of pyridine, piperidine, aniline, morpholine, ethylene diamine, N-methyl morpholine, N-methyl piperidine, N,N-dimethylaniline and ethyleneglycol dimethyl ethers of the formula $CH_3O(C_2H_4O)_nCH_3$, where $n$ is an integer from 1 to 4, and recovering the resultant alkali metal triloweralkoxyborohydride.

2. A method according to claim 1 in which said alkali metal hydride is sodium hydride and said borate ester is trimethyl borate.

3. A method in accordance with claim 2 in which said reaction is carried out at a temperature of about 25° to 68° C.

4. A method of preparing sodium trimethoxyborohydride which comprises reacting sodium hydride with a 10% molar excess of trimethylborate at a temperature of 25° to 68° C. in the presence of 1 to 10 mol percent, based on the amount of sodium hydride used, of pyridine.

5. A method of preparing sodium trimethoxyborohydride which comprises reacting sodium hydride with a 10% molar excess of trimethylborate at a temperature of 25° to 68° C. in the presence of 1 to 10 mol percent, based on the amount of sodium hydride used, of piperidine.

References Cited in the file of this patent

UNITED STATES PATENTS 2,494,968    Schlesinger et al. _____ Jan. 17, 1950

OTHER REFERENCES

Brown et al.: "J. Amer. Chem. Soc.," 75, pp. 192–195 (January 5, 1953).

Brown et al.: "J. Amer. Chem. Soc.," 75, pp. 6263–65, December 20, 1953.